Nov. 2, 1926.  A. KORONSKI  1,605,351

LOCKING MEANS FOR GAS OR OTHER STOPCOCKS

Filed Feb. 6, 1922

INVENTOR
André Koronski

Patented Nov. 2, 1926.

1,605,351

UNITED STATES PATENT OFFICE.

ANDRÉ KORONSKI, NOW BY JUDICIAL CHANGE OF NAME ANDREW KING, OF NARBERTH, PENNSYLVANIA.

LOCKING MEANS FOR GAS OR OTHER STOPCOCKS.

Application filed February 6, 1922. Serial No. 534,609.

The object of this invention is to provide a simple and inexpensive means of locking a stop cock so that small children cannot readily open it and so it cannot be opened accidentally by brushing against it, and to automatically lock the stopcock as it is turned off. With these objects in view I have placed the locking means in such position relative to the stopcock handle that it is impossible to unlock it by brushing against it and so that it is very unlikely that small children will be able to operate both the unlocking means and the stopcock handle at the same time.

This lock is readily attachable to nearly any form of stopcock without changing in any way the said stopcock nor otherwise mutilating it.

I attain these objects by the construction shown in the accompanying drawings and in which—

Figure 1:
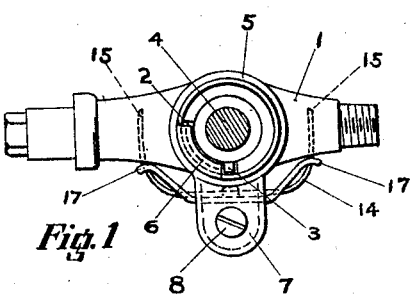
Fig. 1 is a section on the line 2—2 in Fig. 2.
Figure 4:
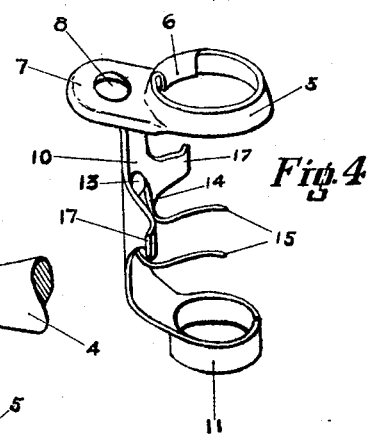
Fig. 4 is a perspective view of the assembled lock by itself.
Figures 2, 3:
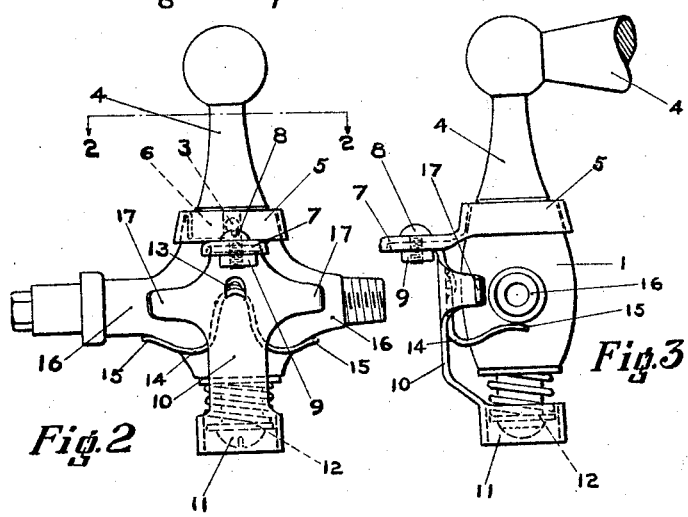
Fig. 2 is a side view of a stopcock to which has been attached a lock of this type.
Fig. 3 is an end view of Fig. 2.

Referring to Figs. 1 to 4 inclusive, 1 is the body of the stopcock which is provided with a notch 2 as usual and in which rides the pin 3 which limits the throw of the stem 4. Fitting loosely over the top of the body 1 is the collar 5 which is provided with a turned down lip 6 which is adapted to fit into the notch 2 in the path of the pin 3 and prevent the rotation of the stem 4. Integral with the collar 5 is the extension 7 to which is attached by means of the screw 8 and the nut 9 the guide 10 which is provided at its lower end with the collar 11 which is adapted to slip loosely over the washer 12 which forms part of the stop cock. At the point 13 is attached the spring 14 which holds the lock in its locked position the said spring being provided with two arms 15 which contact with the under side of the parts 16 of the body 1. The guide 10 is also provided with two fingers 17 which ride loosely against the parts 16 to prevent the lock from rotating. This keeps the lip 6 always in the proper position, ready to drop into the notch 2 as the stopcock is turned off.

The lock is unlocked by placing the forefinger under the extension 7 and raising the lock as a whole immediately before turning on the stopcock.

I am aware that prior to my invention stopcocks provided with locks have been made so I therefore do not claim such a combination broadly but I claim:

1. The combination of a stopcock and a lock for the same which can be attached thereto without necessitating a special construction of said stopcock, said lock consisting of a collar adapted to slip over the stem of said stopcock and provided with a locking lip coacting with parts of said stopcock to lock said stopcock and means for guiding said collar and preventing it from rotating while said stopcock is being operated.

2. The combination of a stopcock provided with a notch and a pin riding therein for limiting the throw of the stem of the said stopcock and a lock which includes a collar having a bent down lip which is adapted to fit into and fill said notch so as to prevent said pin from moving in said notch, said collar being provided with a guide which comprises two fingers contacting with the cock body to keep said lip in the proper position relative to said notch and pin.

3. The combination of a stopcock and a lock comprising a locking collar which is slipped over the top of the cock stem, a guide piece which is slipped up from the bottom and means for attaching said collar to said guide.

4. The combination of a stopcock of the type having a notch and pin for limiting the throw and a lock for said stopcock which can be attached thereto without modifying said stopcock, said lock comprising a locking collar provided with a lip which practically fills the space between the edge of the notch and the pin, a guide for said collar and a spring for holding said collar and guide in the locking position.

5. A safety lock for stopcocks which can be readily attached thereto without modifying said stopcocks and comprising a collar provided with a locking lip, a guide for said collar, said guide being provided with laterally extending arms contacting with said stopcock and a guide collar which rides over the lower part of said cock for holding said locking lip in the proper position.

6. The combination of a stopcock of ordinary pattern having a notch and a pin to limit the throw of the stem and a lock comprising a collar provided with a lip which fills said notch and prevents said pin from moving in said notch, an extension integral with said collar, a guide attached to said extension and a spring for holding said lock in the locking position.

7. A lock for stopcocks of the type provided with a notch in which rides a pin for limiting the throw of the handle and with a screw and spring for holding the stem of said cock in position, said lock comprising a collar provided with a lip located in the notch in the path of said pin, a guide attached to said collar and provided with a sleeve riding on said screw and a spring for holding said lock in the locked position.

8. A stopcock of the type having a spring and a screw at the bottom for the purpose of holding the rotating part of the cock in place, a lock provided with two collars, the upper one having a locking lip and the lower one riding over the head of said screw and acting as a guide and means for holding the lock in its locked position.

9. In a lock for stopcocks of the type having a pin riding in a notch, the combination of a collar, a piece integral therewith, said piece fitting in the notch in the path of said pin to prevent said cock from being operated and means for raising said collar and piece when it is desired to turn on said stopcock.

10. A lock for stopcocks of the type having a pin riding in a notch for limiting the throw of said cock, said lock comprising a collar provided with a locking part which practically fills said notch and prevents said pin from moving therein and means for raising said collar and locking part so as to allow said pin to move in said notch.

ANDRÉ KORONSKI.